US011996281B1

(12) United States Patent
Wright et al.

(10) Patent No.: US 11,996,281 B1
(45) Date of Patent: May 28, 2024

(54) SYSTEM AND METHOD FOR INTRODUCING ALUMINUM TO AN ION SOURCE

(71) Applicant: Applied Materials, Inc., Santa Clara, CA (US)

(72) Inventors: Graham Wright, Newburyport, MA (US); Ori Noked, Brookline, MA (US); Craig R. Chaney, Gloucester, MA (US); Adam M. McLaughlin, Merrimac, MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/206,910

(22) Filed: Jun. 7, 2023

(51) Int. Cl.
*H01J 7/02* (2006.01)
*H01J 1/20* (2006.01)
*H01J 7/24* (2006.01)

(52) U.S. Cl.
CPC *H01J 7/02* (2013.01); *H01J 1/20* (2013.01); *H01J 7/24* (2013.01)

(58) Field of Classification Search
CPC ................... H01J 7/02; H01J 7/24; H01J 1/20
See application file for complete search history.

(56) References Cited

U.S. PATENT DOCUMENTS 3,721,731 A 3/1973 Belknap
5,977,552 A 11/1999 Foad
2009/0028766 A1 1/2009 Imamura
2021/0020403 A1* 1/2021 Murooka ............ H01J 37/3171
2023/0326702 A1 10/2023 Hahto et al.

FOREIGN PATENT DOCUMENTS

| | | | |
|---|---|---|---|
| CN | 101844787 | A | 9/2010 |
| CN | 201729667 | U | 2/2011 |
| CN | 201729668 | U | 2/2011 |
| CN | 104402032 | A | 3/2015 |
| CN | 105776294 | A | 7/2016 |
| CN | 108862347 | A | 11/2018 |
| CN | 109942013 | A | 6/2019 |
| JP | 2007-42841 | A | 2/2007 |
| JP | 5125504 | B2 | 1/2013 |
| JP | 5550579 | B2 | 7/2014 |
| JP | 2023-154377 | A | 10/2023 |

* cited by examiner

*Primary Examiner* — Anne M Hines
(74) *Attorney, Agent, or Firm* — NIELDS, LEMACK & FRAME, LLC

(57) ABSTRACT

An ion source that may be used to introduce a dopant material into the arc chamber is disclosed. A component containing the dopant material is disposed in the path of an etching gas, which also enters the arc chamber. In some embodiments, the dopant material is in liquid form, and the etching gas travels through the liquid. In other embodiments, the dopant material is a solid material. In some embodiments, the solid material is formed as a porous structure, such that the etching gas flows through the solid material. In other embodiments, one or more components of the ion source are manufactured using a material that includes the dopant material, such that the etching gas etches the component to release the dopant material.

20 Claims, 14 Drawing Sheets

SYSTEM AND METHOD FOR INTRODUCING ALUMINUM TO AN ION SOURCE

FIELD

Embodiments of the present disclosure relate to an ion source and more particularly, an ion source that may be used to introduce a specific dopant, such as aluminum, into the ion source.

BACKGROUND

Various types of ion sources may be used to create the ions that are used in semiconductor processing equipment. For example, an indirectly heated cathode (IHC) ion source operates by supplying a current to a filament disposed behind a cathode. The filament emits thermionic electrons, which are accelerated toward and heat the cathode, in turn causing the cathode to emit electrons into the arc chamber of the ion source. The cathode is disposed at one end of an arc chamber. A repeller may be disposed on the end of the arc chamber opposite the cathode. The cathode and repeller may be biased so as to repel the electrons, directing them back toward the center of the arc chamber. In some embodiments, a magnetic field is used to further confine the electrons within the arc chamber. A plurality of sides is used to connect the two ends of the arc chamber.

An extraction aperture is disposed along one of these sides, proximate the center of the arc chamber, through which the ions created in the arc chamber may be extracted.

In certain embodiments, it may be desirable to create ions of a particular species, such as aluminum. Traditionally, a vaporizer is used to introduce a solid material, referred to as a charge. This solid material may be aluminum, for example. However, these vaporizers have slow transition times (i.e., warm up and cool down times), making it difficult to switch modes of operations quickly. Further, the amount of charge that may be introduced varies due to the complexity and space limitations of current vaporizers. Finally, vaporizers are also sensitive to stray heat, which may impact the charge life.

Therefore, it would be beneficial to have a mechanism to introduce dopants that did not suffer from these drawbacks.

SUMMARY

An ion source that may be used to introduce a dopant material into the arc chamber is disclosed. A component containing the dopant material is disposed in the path of an etching gas, which also enters the arc chamber. In some embodiments, the dopant material is in liquid form, and the etching gas travels through the liquid. In other embodiments, the dopant material is a solid material. In some embodiments, the solid material is formed as a porous structure, such that the etching gas flows through the solid material. In other embodiments, one or more components of the ion source are manufactured using a material that includes the dopant material, such that the etching gas etches the component to release the dopant material.

According to one embodiment, an ion source is disclosed. The ion source comprises an arc chamber having a gas inlet; a source of an etching gas; an aluminum containing component; and a pathway from the source of the etching gas to the gas inlet, wherein the etching species flows through the aluminum containing component, wherein a chemical reaction between the aluminum containing component and the etching gas causes aluminum to be introduced into the arc chamber. In some embodiments, the aluminum containing component comprises a cavity containing aluminum in liquid form, wherein the etching gas flows through the aluminum. In certain embodiments, the aluminum containing component comprises a cavity containing aluminum in solid form, wherein the aluminum is configured as a porous structure and the etching gas flows through the porous structure. In certain embodiments, the ion source includes a heater disposed proximate to the cavity to increase a reaction rate of the aluminum and the etching gas. In certain embodiments, the ion source includes a cooler disposed proximate to the cavity, to control a temperature of the cavity. In some embodiments, the aluminum containing component comprises a cavity comprising a channel, wherein the cavity contains aluminum in solid form, and wherein the channel has open walls such that the etching gas reacts with aluminum as it flows through the channel. In some embodiments, the channel comprises a lattice. In some embodiments, the ion source includes a gas bushing having an internal conduit, wherein the etching gas flows from the source of the etching gas, through the internal conduit and to the gas inlet, wherein the aluminum containing component is the gas bushing, which is made of, but not limited to, alumina or aluminum nitride. In some embodiments, the gas bushing comprises fins extending into the internal conduit of the gas bushing. In some embodiments, a lattice is disposed in the internal conduit of the gas bushing. In some embodiments, the ion source comprises a gas bushing having an internal conduit, wherein the etching gas flows from the source of the etching gas, through the internal conduit and to the gas inlet, wherein the aluminum containing component is a coating disposed on walls of the internal conduit. In some embodiments, the ion source comprises an electrode disposed in the arc chamber in communication with the gas inlet, wherein the electrode comprises a porous material, wherein the etching gas flows from the source of the etching gas through the electrode, and wherein the aluminum containing component is the electrode. In certain embodiments, the electrode is electrically biased, and portions of exterior surfaces of the electrode are coated with a conductive material. In certain embodiments, the electrode comprises a side electrode or a repeller.

According to another embodiment, an indirectly heated cathode ion source is disclosed. The indirectly heated cathode ion source comprises an arc chamber, comprising a gas inlet; a source of etching gas; and a gas bushing, having an internal conduit in communication with the source of etching gas and the gas inlet, wherein the gas bushing is constructed from a material comprising a dopant species. In some embodiments, the dopant species comprises aluminum and the material comprises alumina or aluminum nitride. In some embodiments, a feature is disposed in the internal conduit to increase a surface area of the internal conduit. In certain embodiments, the feature comprises fins that extend into the internal conduit. In certain embodiments, the feature comprises a lattice. In certain embodiments, the lattice comprises a spiral path.

BRIEF DESCRIPTION OF THE FIGURES

For a better understanding of the present disclosure, reference is made to the accompanying drawings, which are incorporated herein by reference and in which.

DETAILED DESCRIPTION

As noted above, certain dopants, such as aluminum and other metals, are typically provided into an arc chamber using a vaporizer. However, there are several shortcomings of this approach. As noted above, vaporizers have long warmup and cooldown times. Further, vaporizers use sensitive or dangerous powders as charge material.

Figure 1:
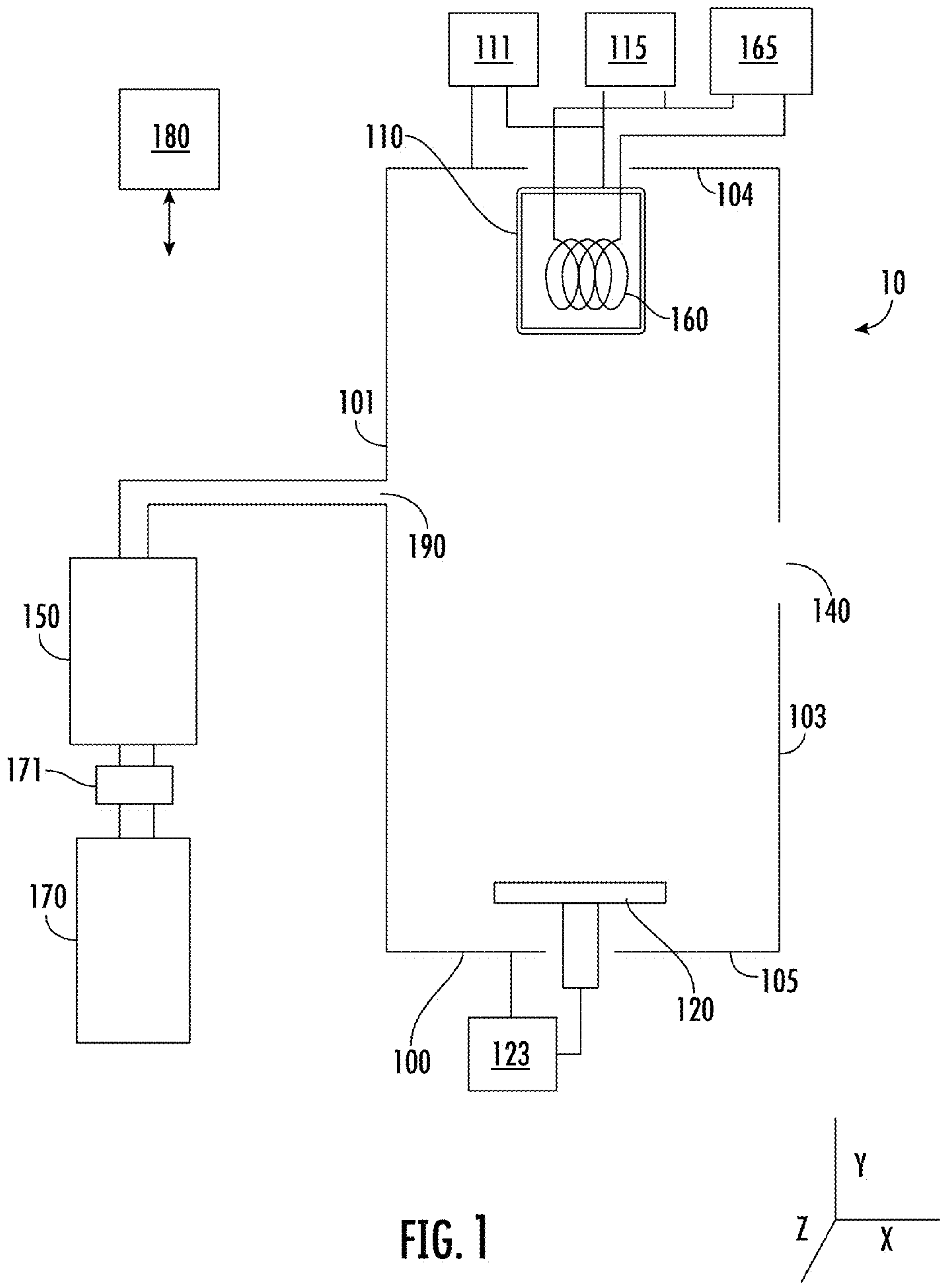
FIG. 1 is an indirectly heated cathode (IHC) ion source for introducing aluminum in accordance with one embodiment.

FIG. 1 shows an IHC ion source 10 that overcomes these issues. The IHC ion source 10 includes an arc chamber 100, comprising two opposite ends, and walls 101 connecting to these ends. The walls 101 of the arc chamber 100 may be constructed of an electrically conductive material and may be in electrical communication with one another. In some embodiments, a liner may be disposed proximate one or more of the walls 101. A cathode 110 is disposed in the arc chamber 100 at a first end 104 of the arc chamber 100. A filament 160 is disposed behind the cathode 110. The filament 160 is in communication with a filament power supply 165. The filament power supply 165 is configured to pass a current through the filament 160, such that the filament 160 emits thermionic electrons. Cathode bias power supply 115 biases filament 160 negatively relative to the cathode 110, so these thermionic electrons are accelerated from the filament 160 toward the cathode 110 and heat the cathode 110 when they strike the back surface of cathode 110. The cathode bias power supply 115 may bias the filament 160 so that it has a voltage that is between, for example, 200V to 1500V more negative than the voltage of the cathode 110. The cathode 110 then emits thermionic electrons on its front surface into arc chamber 100.

Thus, the filament power supply 165 supplies a current to the filament 160. The cathode bias power supply 115 biases the filament 160 so that it is more negative than the cathode 110, so that electrons are attracted toward the cathode 110 from the filament 160. In certain embodiments, the cathode 110 may be biased relative to the arc chamber 100, such as by bias power supply 111. In other embodiments, the cathode 110 may be electrically connected to the arc chamber 100, so as to be at the same voltage as the walls 101 of the arc chamber 100. In these embodiments, bias power supply 111 may not be employed and the cathode 110 may be electrically connected to the walls 101 of the arc chamber 100. In certain embodiments, the arc chamber 100 is connected to electrical ground.

On the second end 105, which is opposite the first end 104, a repeller 120 may be disposed. The repeller 120 may be biased relative to the arc chamber 100 by means of a repeller bias power supply 123. In other embodiments, the repeller 120 may be electrically connected to the arc chamber 100, so as to be at the same voltage as the walls 101 of the arc chamber 100. In these embodiments, repeller bias power supply 123 may not be employed and the repeller 120 may be electrically connected to the walls 101 of the arc chamber 100. In other embodiments, the cathode and repeller may share a power supply. In still other embodiments, a repeller 120 is not employed.

The cathode 110 and the repeller 120 are each made of an electrically conductive material, such as a metal or graphite.

In certain embodiments, a magnetic field is generated in the arc chamber 100. This magnetic field is intended to confine the electrons along one direction. The magnetic field typically runs parallel to the walls 101 from the first end 104 to the second end 105. For example, electrons may be confined in a column that is parallel to the direction from the cathode 110 to the repeller 120 (i.e. the y direction). Thus, electrons do not experience any electromagnetic force to move in the y direction. However, movement of the electrons in other directions may experience an electromagnetic force.

Disposed on one side of the arc chamber 100, referred to as the extraction plate 103, may be an extraction aperture 140. In FIG. 1, the extraction aperture 140 is disposed on a side that is parallel to the Y-Z plane (perpendicular to the page). A gas inlet 190 may be disposed on one wall of the arc chamber 100.

The IHC ion source 10 may be part of an ion implantation system, which may include extraction optics, a mass analyzer, a mass resolving aperture, a collimator, an acceleration/deceleration stage and a workpiece holder. Specifically, disposed outside and proximate the extraction aperture 140 of the IHC ion source 10 are extraction optics. Located downstream from the extraction optics is the mass analyzer. The mass analyzer uses magnetic fields to guide the path of the extracted ions. The magnetic fields affect the flight path of ions according to their mass and charge. A mass resolving device that has a resolving aperture is disposed at the output, or distal end, of the mass analyzer. By proper selection of the magnetic fields, only those ions that have a selected mass and charge will be directed through the resolving aperture. Other ions will strike the mass resolving device or a wall of the mass analyzer and will not travel any further in the system.

A collimator may be disposed downstream from the mass resolving device. The collimator accepts the extracted ions that pass through the resolving aperture and creates a ribbon ion beam formed of a plurality of parallel or nearly parallel beamlets. In other embodiments, the ion beam may be a spot beam. In this embodiment, an electrostatic scanner is used to move the spot beam in the first direction.

Located downstream from the collimator may be an acceleration/deceleration stage. The acceleration/deceleration stage may be an electrostatic filter. The electrostatic filter is a beam-line lens component configured to independently control deflection, deceleration, and focus of the ion beam. Located downstream from the acceleration/deceleration stage is the workpiece holder. The ions extracted from the IHC ion source 10 may be directed toward a workpiece disposed on the workpiece holder. The workpiece may be a silicon wafer, a silicon carbide wafer, a gallium nitride wafer or another semiconductor wafer.

Further, the IHC ion source 10 may be in communication with at least one gas source. The gas source 170 may contain an etching gas, which may be a halogen gas, such as chlorine or fluorine. The etching gas may also include other species, such as molecular species that include halogens, inert gases, hydrogen or other species. In another embodiment, the etching gas may be hydrogen chloride (HCl).

A valve 171 may be utilized to control the flow of the etching gas from the gas source 170 to the IHC ion source 10.

A controller 180 may be in communication with one or more of the power supplies such that the voltage or current supplied by these power supplies may be modified. The controller 180 may also be in communication with the valve 171, and the coolers and heaters as described below. The controller 180 may include a processing unit, such as a microcontroller, a personal computer, a special purpose controller, or another suitable processing unit. The controller 180 may also include a non-transitory storage element, such as a semiconductor memory, a magnetic memory, or another suitable memory. This non-transitory storage element may contain instructions and other data that allows the controller 180 to perform the functions described herein.

An aluminum containing component 150 is disposed in the pathway between the gas inlet 190 and the gas source 170. The aluminum containing component 150 may take various forms as described below. The pathway between the gas source 170 and the gas inlet 190 may be located in various positions as well.

Figure 2A:
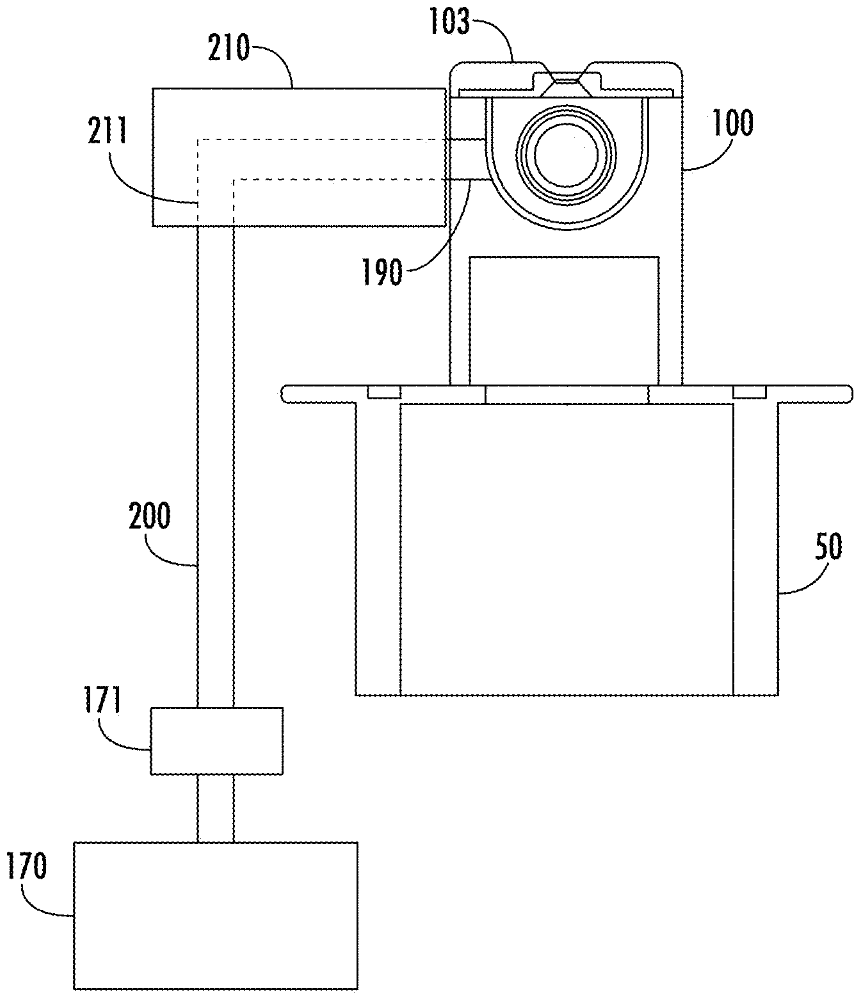
FIG. 2A-2B show the pathway from the gas source to the arc chamber according to two embodiments.
Figure 2B:
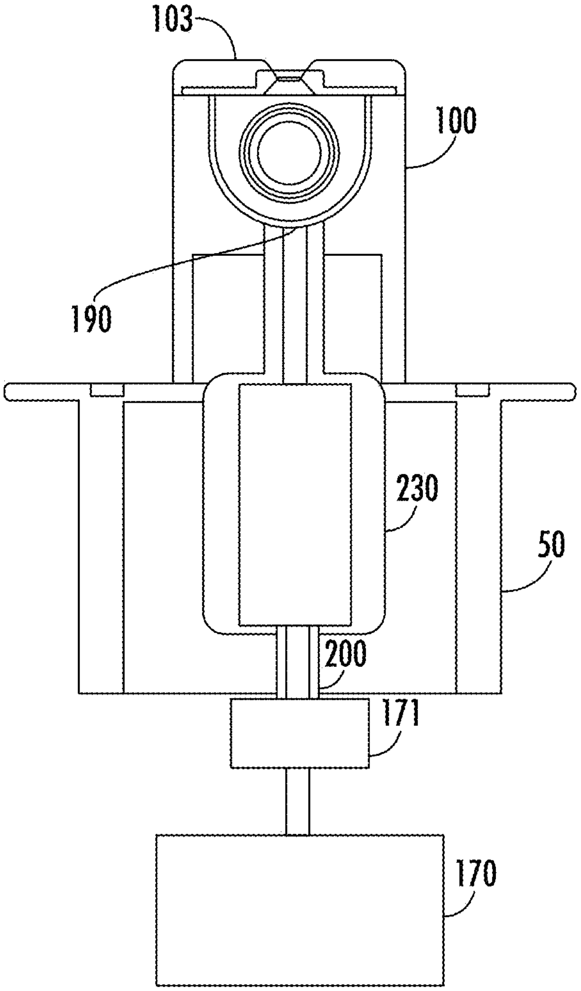

For example, as shown in FIGS. 2A-2B, the arc chamber 100 rests on a source housing 50 or on an arc chamber support. The source housing 50 may be cooled to draw heat from the arc chamber 100. In some embodiments, the source housing 50 may have a hollow interior. In FIG. 2A, the pathway is disposed outside of the source housing 50, and may comprise a gas line 200 that travels outside the source housing 50 from the gas source 170 to the aluminum containing component, which may be the gas bushing 210. The gas bushing 210 includes an internal conduit 211, which is in fluid communication with the gas line 200 and the gas inlet 190. The gas inlet 190 may be disposed on one of the walls of the arc chamber 100, adjacent to the extraction plate 103. In some embodiments, the gas bushing 210 may be constructed from graphite or another suitable material. In FIG. 2B, the pathway is disposed inside the source housing 50, and may include a gas line 200 and an internal chamber 230, which is the aluminum containing component. In this embodiment, the internal chamber 230 is disposed between the gas source 170 and the gas inlet 190, which is located on the wall opposite the extraction plate 103. The internal chamber 230 may be constructed from graphite or another suitable material.

Figure 3A:
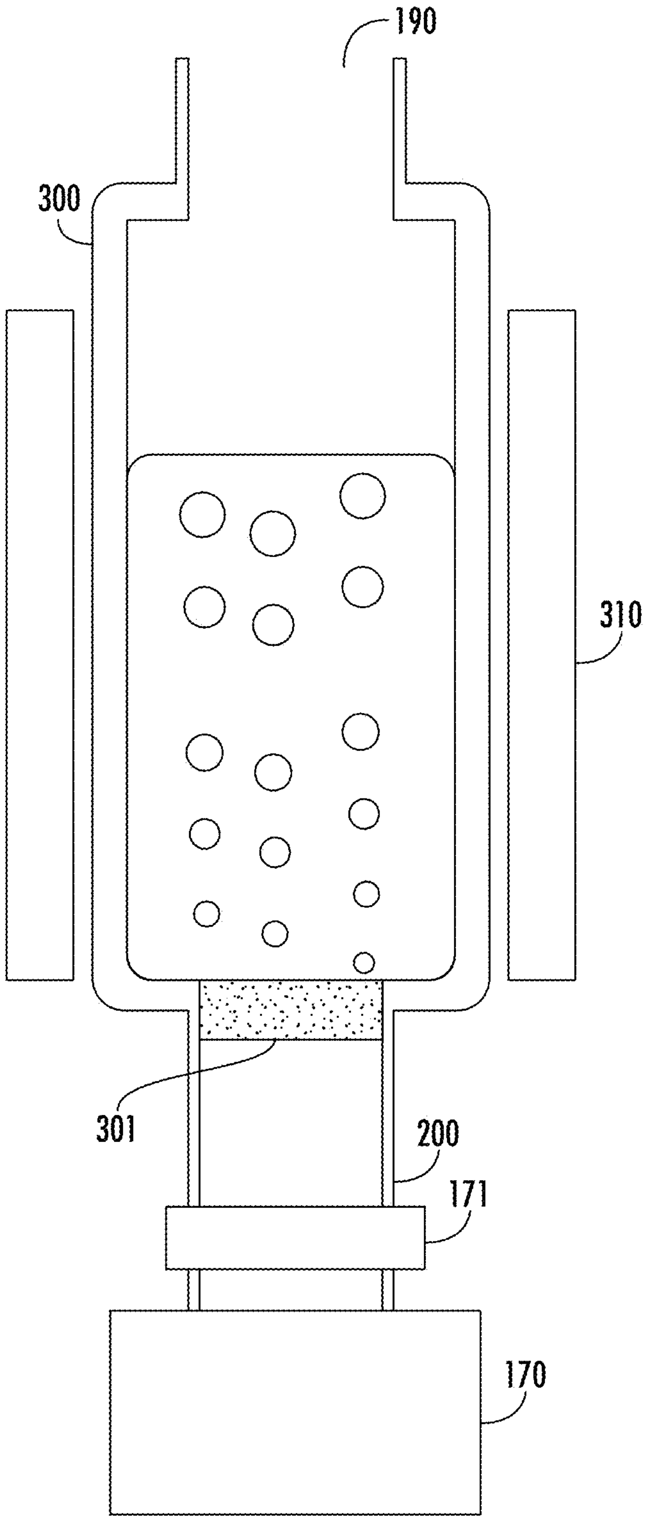
FIGS. 3A-3B each show an aluminum containing component that includes liquid aluminum.
Figure 3B:
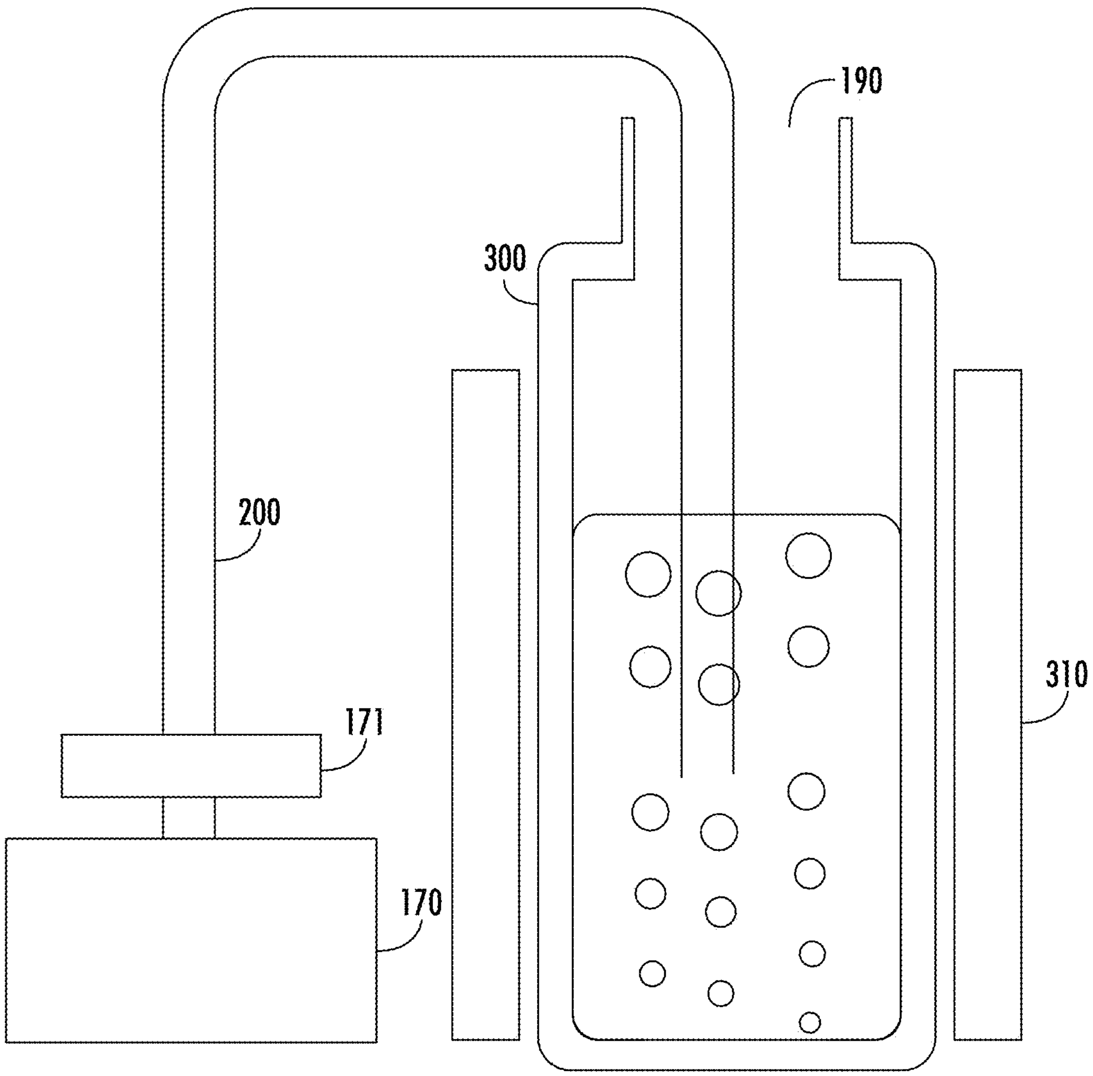

As noted above, the aluminum containing component may take various forms. FIGS. 3A-3B show a first embodiment of the aluminum component. In these embodiments, the aluminum containing component is a cavity 300, which is used to hold a reservoir of liquid aluminum. The cavity 300 may have an internal volume of between 1 cubic inch and 10 cubic inches. In some embodiments, there may be more than one cavity 300. The cavity 300 may be constructed of graphite or quartz. Alternatively, metals with high melting points, such as stainless steel, tungsten or tantalum may also be used to create the cavity 300. The source for the liquid aluminum may be in the form of solid pellets, shavings or some other shape. The aluminum used in this embodiment may be pure aluminum, such as aluminum 1100. In this disclosure, the term "pure aluminum" is used to describe a metal which is at least 80% aluminum, such as between 80% and 99.999% pure aluminum. This cavity 300 may be the internal chamber 230 shown in FIG. 2B, or may be a void within the gas bushing 210 (see FIG. 2A). Heaters 310 are disposed proximate to the cavity 300 so as to heat the solid aluminum above its melting point, changing the aluminum to liquid form. In some embodiments, the heaters 310 may surround the cavity 300 on all sides. Additionally, a temperature sensor may be proximate the cavity to monitor the temperature of the cavity 300. The gas line 200 is in fluid communication with the gas source 170 and the cavity 300. In another embodiment, the etching gas is heated prior to its introduction into the cavity 300. The temperature of the heated etching gas may be sufficient to cause the melting of the aluminum which it contacts.

In the embodiment shown in FIG. 3A, a plug 301 may be disposed on the inlet to the cavity 300. The pore size of the plug 301 is dimensioned such that the surface tension of the liquid aluminum is too great to pass through the plug 301. The plug 301 may be made of graphite foam, quartz wool or some other suitable material. However, the etching gas is able to flow through the plug 301. The etching gas passes through the liquid aluminum as it travels to the gas inlet 190.

In the embodiment shown in FIG. 3B, which is referred to as a reentrant design, the gas line 200 enters the top of the cavity 300 and is submerged in the liquid aluminum. The etching gas bubbles through the liquid aluminum as it travels to the gas inlet 190.

In both embodiments, the etching species reacts with the liquid aluminum to form a dopant gas that comprises molecules that include aluminum. For example, if the etching gas contains chlorine, the dopant gas may be aluminum chloride. Further, note that the dopant gas is produced as long as the etching gas is flowing through the liquid aluminum. If the valve 171 is closed, the flow of dopant gas is stopped.

In other embodiments, the aluminum containing component includes aluminum in solid form.

Figure 4:
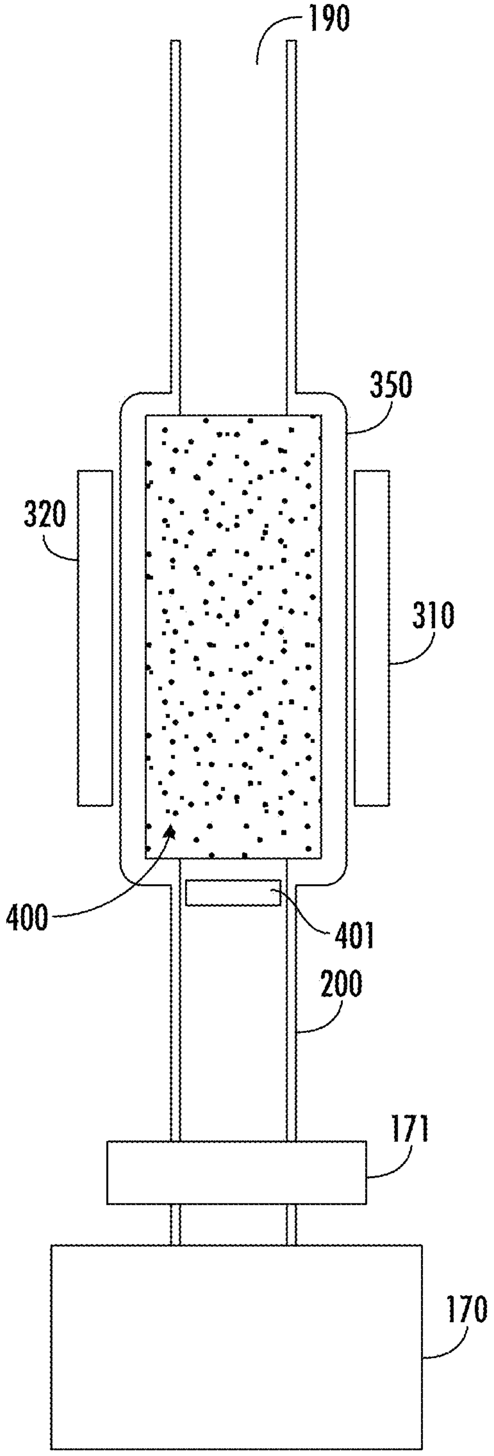
FIG. 4 shows an aluminum containing component that includes a porous structure.

FIG. 4 shows an embodiment wherein the aluminum containing component is a cavity that holds a porous structure. In this embodiment, the aluminum is in solid form and is configured as a porous structure 400. For example, the aluminum may be configured as a foam, a lattice, pellets or as an aluminum matrix. The porous structure 400 is disposed within a cavity 350. The cavity 350 may be constructed of a material that is more resistant to the etching gas than the porous structure 400, such as graphite. A heater 310 may be disposed proximate to the cavity 350 and may be used to heat the porous structure 400 to increase the rate of the reaction between the porous structure 400 and the etching gas. Additionally, in some embodiments, a cooler 320 may be included. For example, if the etching gas is chlorine, the reaction between aluminum and chlorine is exothermic. Thus, to prevent thermal runaway, a cooler 320 may be used to maintain a desired temperature range and prevent the aluminum material from melting. As a non-limiting example, the temperature range may be set to 400-450° C. to allow for a higher reaction rate and be well below the nominal melting temperature of aluminum. For example, the desired temperature may be maintained at a temperature that is 10-40% lower than the melting temperature of the aluminum. Thus, in some embodiments, the heater 310 is used when the flow of etching gas begins. However, once the rate of reaction reaches a certain threshold, it may be possible to disable the heater 310. Additionally, as the reaction continues, the cooler 320 may be enabled to control the exothermic reaction. For example, the heater 310 and the cooler 320 may be used in conjunction to tightly control the temperature of the aluminum material.

Note that the porous structure 400 may be pure aluminum. However, in other embodiments, it may be an aluminum compound, including but not limited to AlN or alumina. Thus, the porous structure 400 may be referred to as an aluminum containing porous structure, which includes structures made of pure aluminum, aluminum alloys and/or other aluminum compounds, such as alumina, aluminum nitride or other ceramics.

Figure 5A:
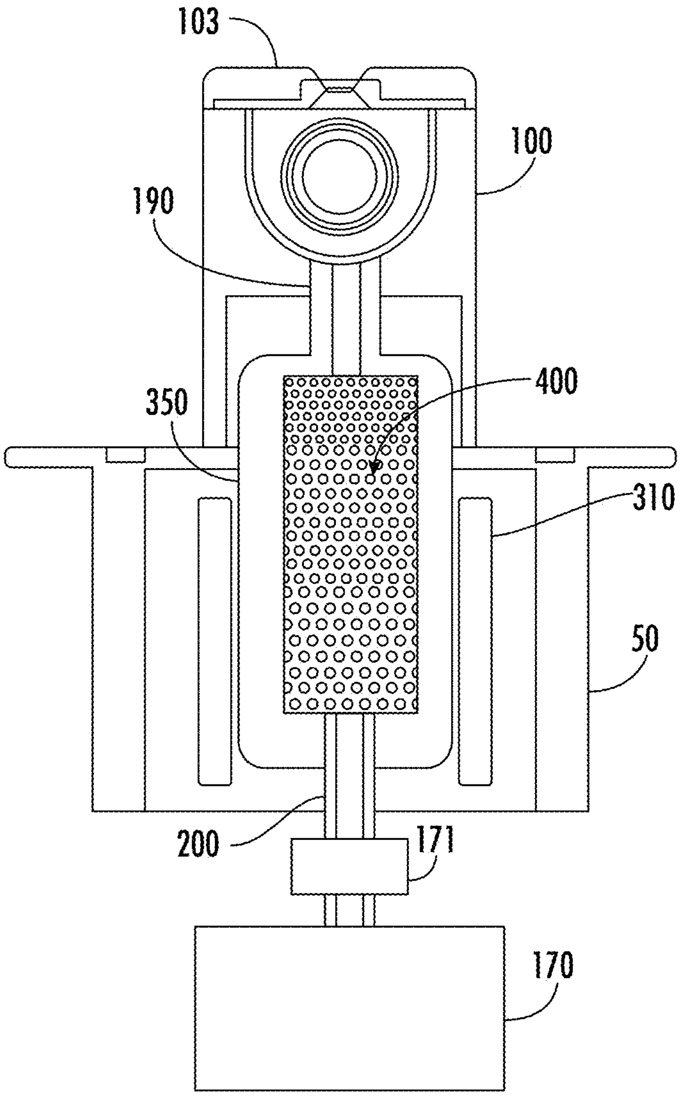
FIGS. 5A-5B are two embodiments that utilize the porous structure of FIG. 4.
Figure 5B:
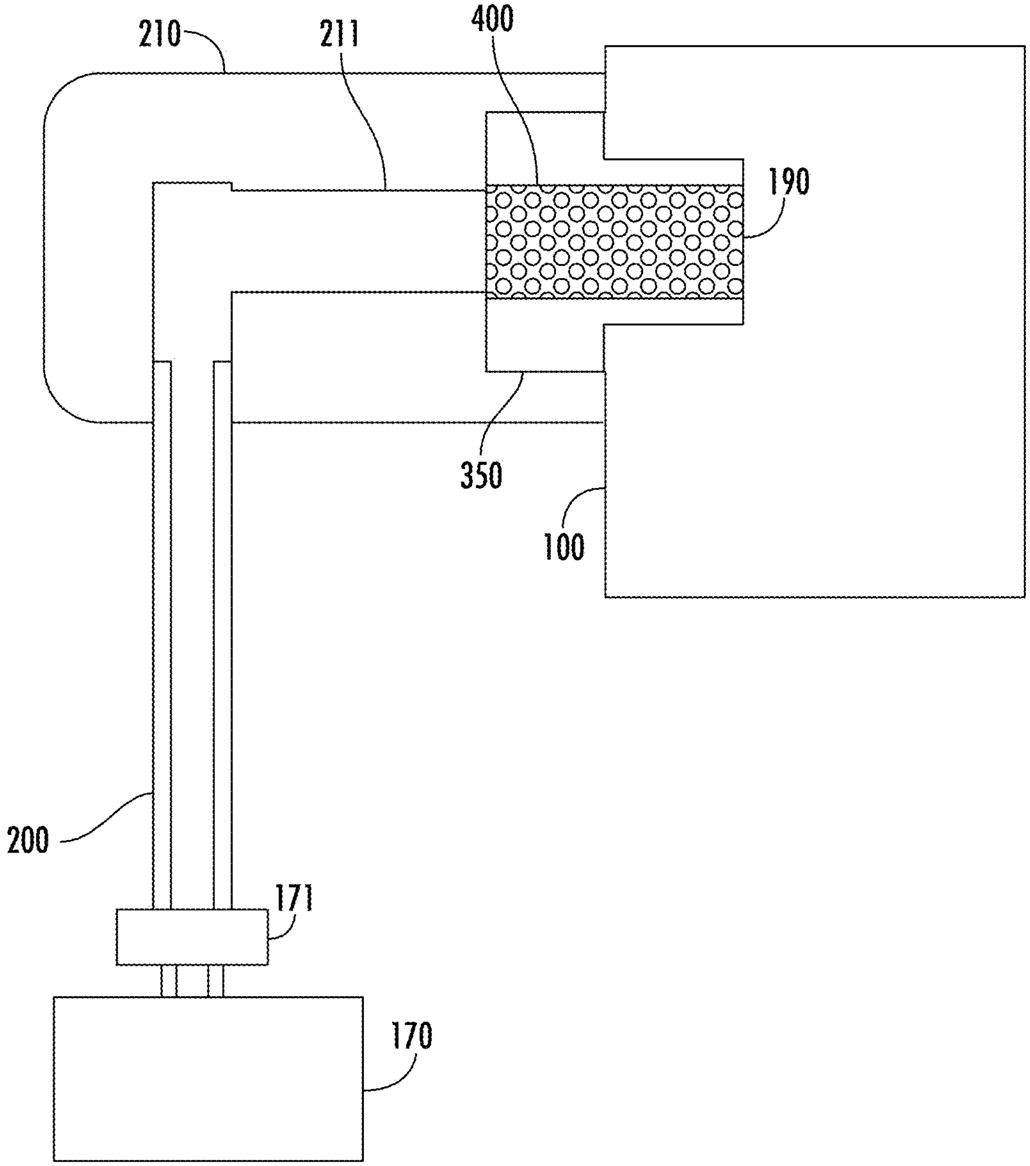

The embodiment shown in FIG. 4 may be implemented in a variety of ways. FIGS. 5A-5B show two embodiments that use the aluminum containing porous structure.

In FIG. 5A, the cavity 350 is disposed within the source housing 50. The porous structure 400 is disposed in the cavity 350. The gas source 170 is in fluid communication with the cavity 350, through valve 171 and gas line 200. Additionally, the cavity 350 is in communication with the gas inlet 190, which may be disposed on the side of the arc chamber 100 that is opposite the extraction plate 103.

In FIG. 5B, the cavity 350 is disposed in the gas bushing 210, which is attached to a gas inlet 190 that is on a chamber wall that may be adjacent to the extraction plate 103. The gas bushing 210 has an internal conduit 211, that has an entrance in communication with the gas line 200 and an exit that attaches to the IHC ion source 10. The cavity 350 is preferably located at the entrance or exit of the internal conduit 211 so that it may be easily replaced. In some embodiments, the gas bushing 210 may be enlarged so as to accommodate internal heaters, similar to those shown in FIGS. 4 and 5A.

In FIGS. 5A-5B, as etching gas flows through the cavity 350, it travels through and reacts with the porous structure, creating molecules or ions that contain the dopant species, which in this embodiment may be aluminum. The flow of dopant species is readily controlled by actuating valve 171.

Thus, FIGS. 5A-5B both show a cavity 350, in which the porous structure 400 is located. The cavity 350 is positioned such that etching gas flows through the gas line 200 and passes through the porous structure 400. The interaction of the porous structure 400 and the etching gas causing the formation of a dopant gas, which then flows through the gas inlet 190 to the arc chamber 100. As shown in the figures, the cavity 350 may be within the source housing 50 or the gas bushing 210. When consumed, the cavity 350 may be accessed by an operator so as to replace the porous structure 400. Thus, in FIGS. 4 and 5A-5B, the aluminum containing component may be a cavity with an aluminum containing porous structure disposed therein. In these embodiments, the etching gas flows through the porous structure 400.

The porosity of the porous structure 400 may be constant throughout the structure. In other embodiments, the porosity may vary. For example, the porosity may be higher near the gas line 200 where the etching gas first contacts the porous structure. Further, in certain embodiments, the density of the porous structure 400 may be constant. In other embodiments, the density may vary. By varying porosity and/or density, the distribution of the etching gas through the porous structure may become more uniform.

Figure 6A:
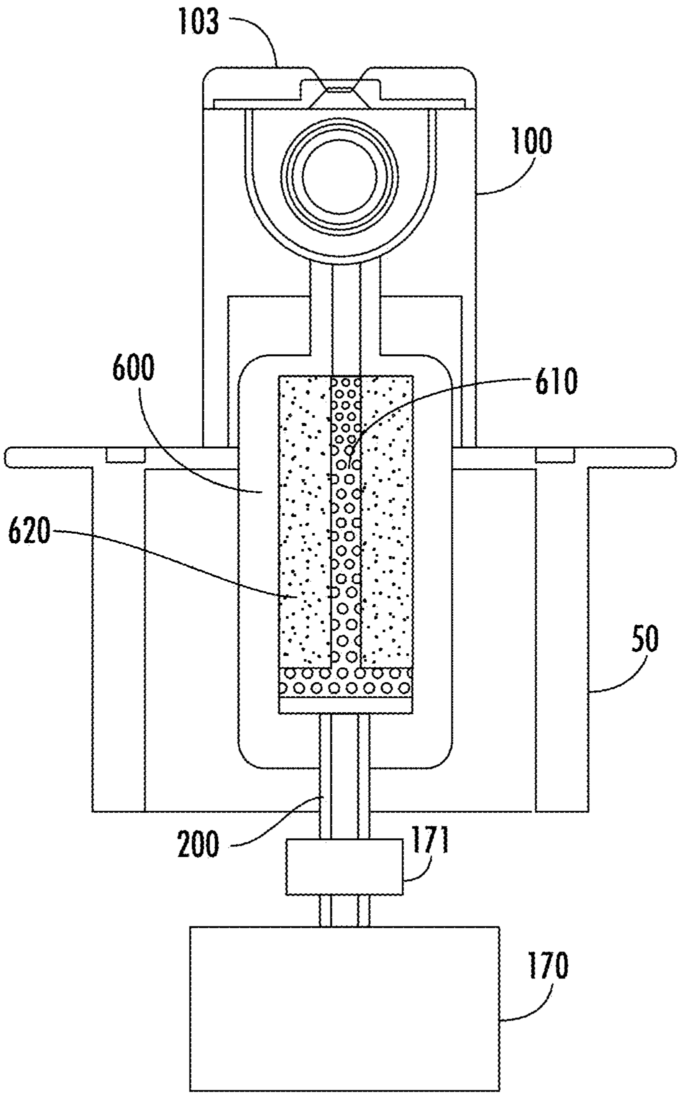
FIGS. 6A-6B show an aluminum containing component that includes a channel according to two embodiments.
Figure 6B:
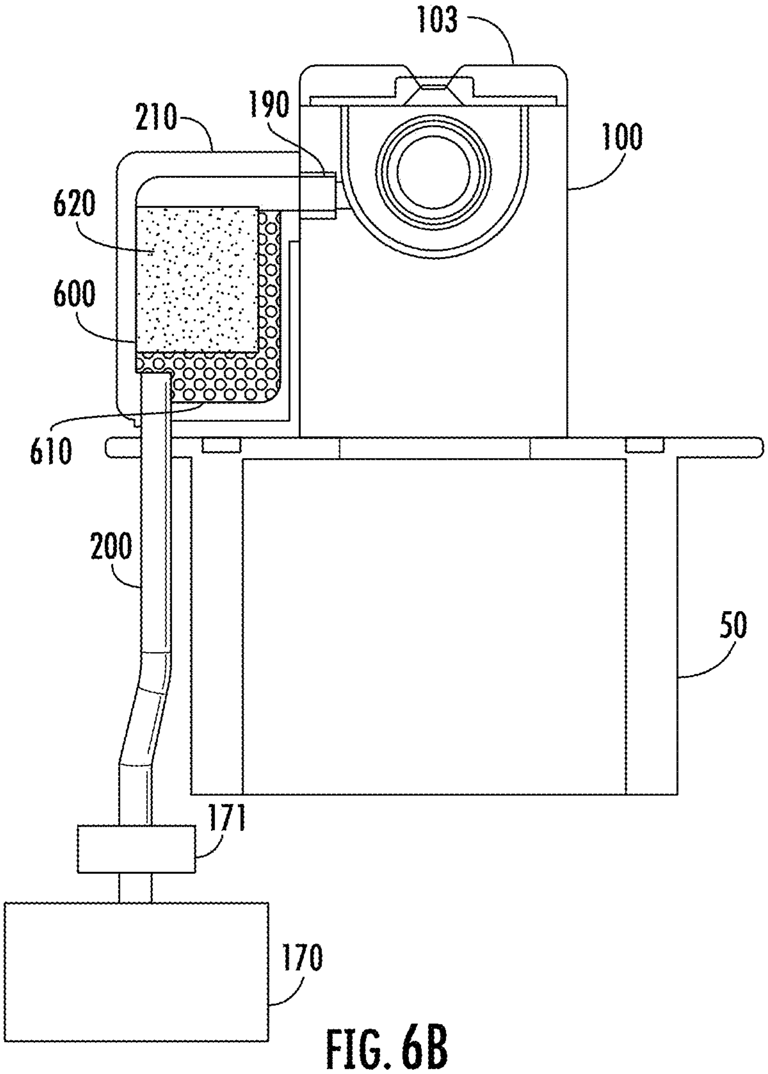

However, in other embodiments, the cavity may be constructed differently. In some embodiments, the cavity may be filled with a solid charge, such as aluminum. In certain embodiments, the cavity may also include a channel through which the etching gas may pass. The channel may have openings in its walls such that the etching gas reacts with the charge. This configuration may allow for a greater volume of the charge. This configuration is shown in FIGS. 6A-6B. In FIG. 6A, a cavity 600 is provided in the interior of the source housing 50. The cavity 600 includes a channel 610 that is in fluid communication with the gas line 200 and the gas inlet 190. The channel 610 may have a lattice structure, such as a gyroid structure, a honeycomb, a ball and beam structure, or another structure that allows the walls of the channel 610 to include openings. The solid material 620 is then loaded into the cavity 600. The solid material 620 is in contact with the channel 610, such that, when enabled, the etching gas reacts with the solid material 620 as it flows through the channel 610. In FIG. 6B, the cavity 600 is located in the gas bushing 210. The channel 610 is in fluid communication with the gas line 200 and the gas inlet 190. The channel 610 may be a lattice, as described above. The solid material 620 is then loaded into the cavity 600, such that the etching gas contacts the solid material 620 as it travels through the channel 610. Note that the size of the gas bushing 210 may be enlarged in this embodiment to hold the solid material 620. Additionally, the enlarged size may allow for the incorporation of heaters, if desired.

Thus, in the embodiments of FIGS. 6A-6B, the aluminum containing component is a cavity having a solid material which contains the dopant species, such as aluminum, disposed therein. A channel is disposed within the cavity that provides a pathway for the etching gas to travel. The channel includes openings in its exterior walls, such that, as the etching gas travels through the channel, it contacts the solid material, creating molecules or ions that contain the dopant species.

In certain embodiments, the etching gas may be hydrogen chloride (HCl). In this embodiment, a catalyzing component, such as a wire, mesh or grid, which is coated with platinum, ruthenium-platinum or another catalyzing material, is disposed near the aluminum charge. For example, FIG. 4 includes a catalyzing component 401 located near the porous structure 400. Although not shown, this catalyzing component 401 may also be introduced in the embodiments shown in FIGS. 5A-5B and 6A-6B.

Figure 7:
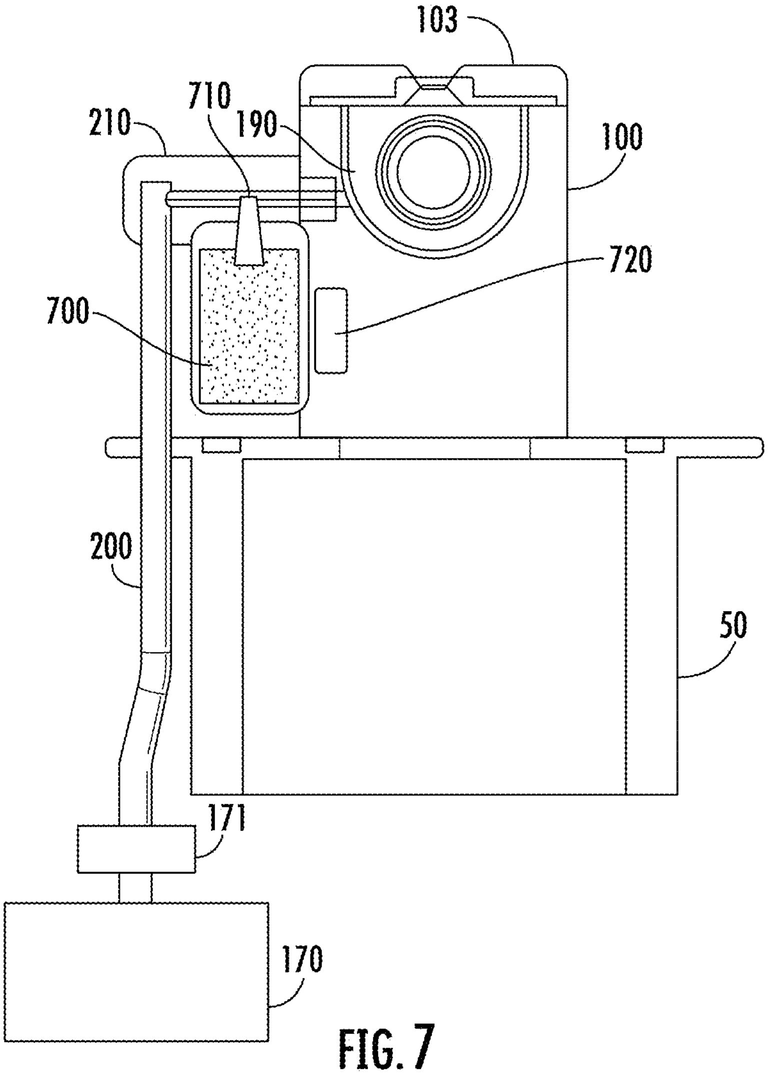
FIG. 7 shows an aluminum containing component that utilizes a wicking rod.

FIG. 7 shows a variation of the configuration shown in FIGS. 6A-6B. In this embodiment, rather than having a channel that is adjacent to the solid material, a wicking rod 710 is used. Specifically, the gas bushing 210 has an internal conduit 211, as described above. A wicking rod 710 extends into the internal conduit 211. The wicking rod 710 may be solid, or may have a hollow center so as to form a tube. The distal end of the wicking rod 710 is disposed in a cavity 700 that extends downward from the internal conduit 211. The cavity 700 may be incorporated into the gas bushing 210, or may be a separate component. A heater 720 may be disposed proximate the cavity 700, if desired. In operation, a solid material, which is or contains the dopant species, is deposited in the cavity 700. The heater 720 is used to melt the solid material. Additional heat may be provided by the arc chamber 100. The liquid material then travels up the wicking rod 710 toward the internal conduit 211. In some embodiments, as gas flows through the internal conduit 211, the venturi effect may also be used to pull material from the cavity 700. The etching gas, which is flowing through the internal conduit 211 reacts with the liquid material disposed in the wicking rod 710 to create gaseous molecules that include the dopant species. These molecules pass through the gas inlet 190 and into the arc chamber 100.

In each of the previous embodiments, a consumable part was inserted into a cavity. That consumable part may be a porous structure, such as was shown in FIGS. 4 and 5A-5B. Alternatively, that consumable part may be a charge of aluminum, which is loaded into the cavity, as shown in FIGS. 3, 6A-6B and 7. Thus, for each of these embodiments, the aluminum containing component includes a cavity that holds the aluminum material.

However, other embodiments are also possible. For example, rather than inserting a consumable part into a cavity, the aluminum containing component may be one of the existing gas bushings that is part of the IHC ion source 10.

Figure 8:
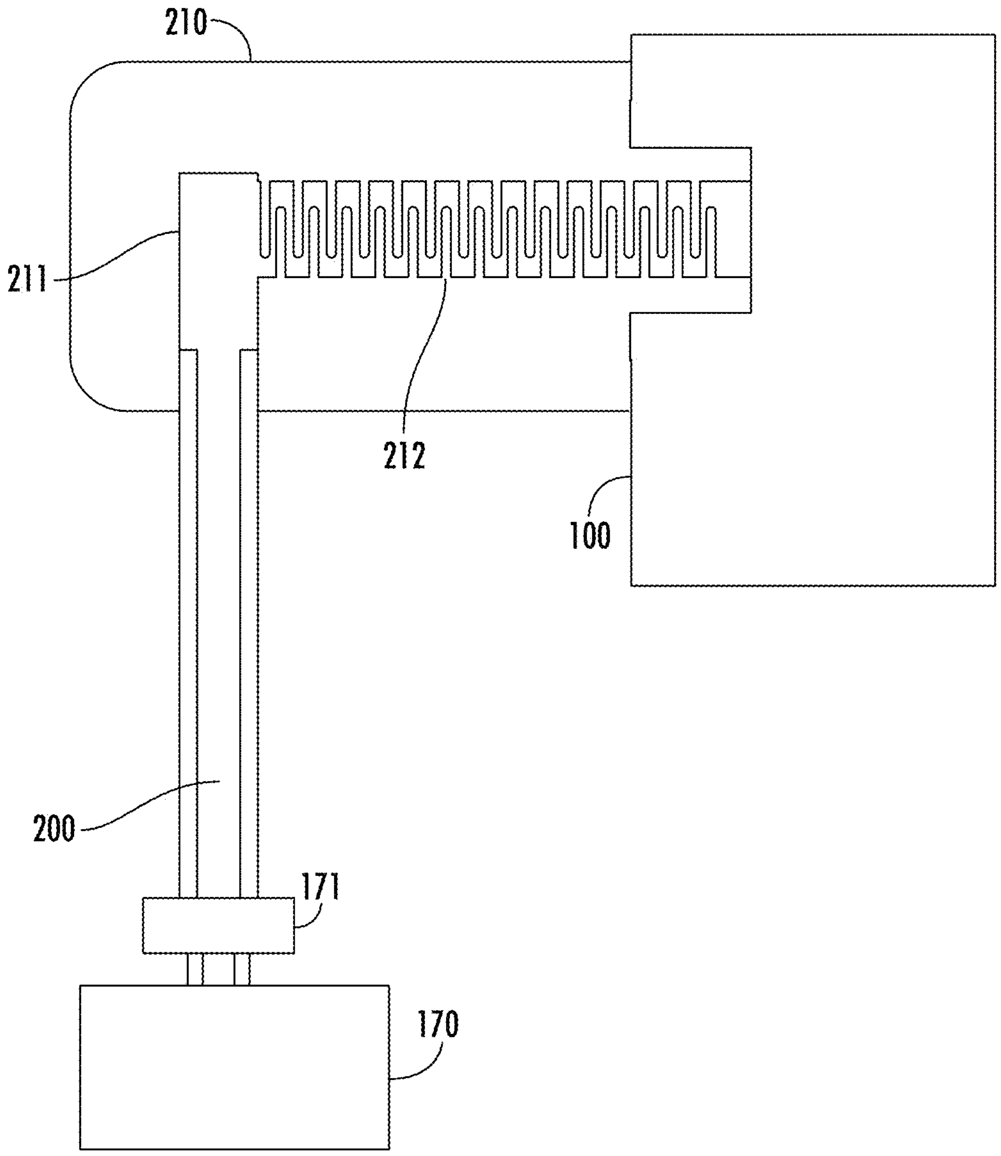
FIG. 8 shows a gas bushing that serves as the aluminum containing component according to one embodiment.

For example, FIG. 8 shows an embodiment where the gas bushing 210 serves as the aluminum containing component. In this embodiment, the gas bushing 210 is not made from graphite or another non-eroding material. Rather, it is made of a material that includes the dopant species. As a non-limiting example, if the dopant species is aluminum, the gas bushing 210 may be constructed from aluminum nitride, alumina, or another aluminum containing ceramic. Further, to increase the amount of interaction between the etching gas and the gas bushing, features may be incorporated into the internal conduit 211 that increase the surface area of the internal conduit 211. For example, FIG. 8 shows fins 212 that extend into the internal conduit 211. The fins 212 are integral with the gas bushing 210, and the gas bushing 210 may be created using an additive manufacturing process. The fins 212 are much thinner than the outer walls of the gas bushing 210 so that the fins 212 are eroded much more quickly than the rest of the gas bushing 210. For example, the outer walls of the gas bushing 210 may be at least 4 times thicker than the fins 212. In some embodiments, the fins 212 extend into the internal conduit 211, and may have a height that is between 25% and 75% of the height of the internal conduit 211. The fins 212 may alternate such that if a first fin extends downward, the fins on either side of that first fin extend upward into the internal conduit 211. The spacing between adjacent fins 212 may vary and be selected to increase surface area while not restricting flow rate. In operation, as etching gas flows through the gas bushing 210, it erodes the fins 212 and delivers aluminum to the gas inlet 190 of the arc chamber 100. The fins 212 may vary in shape, size, thickness and spacing to encourage improved erosion.

Figure 9:
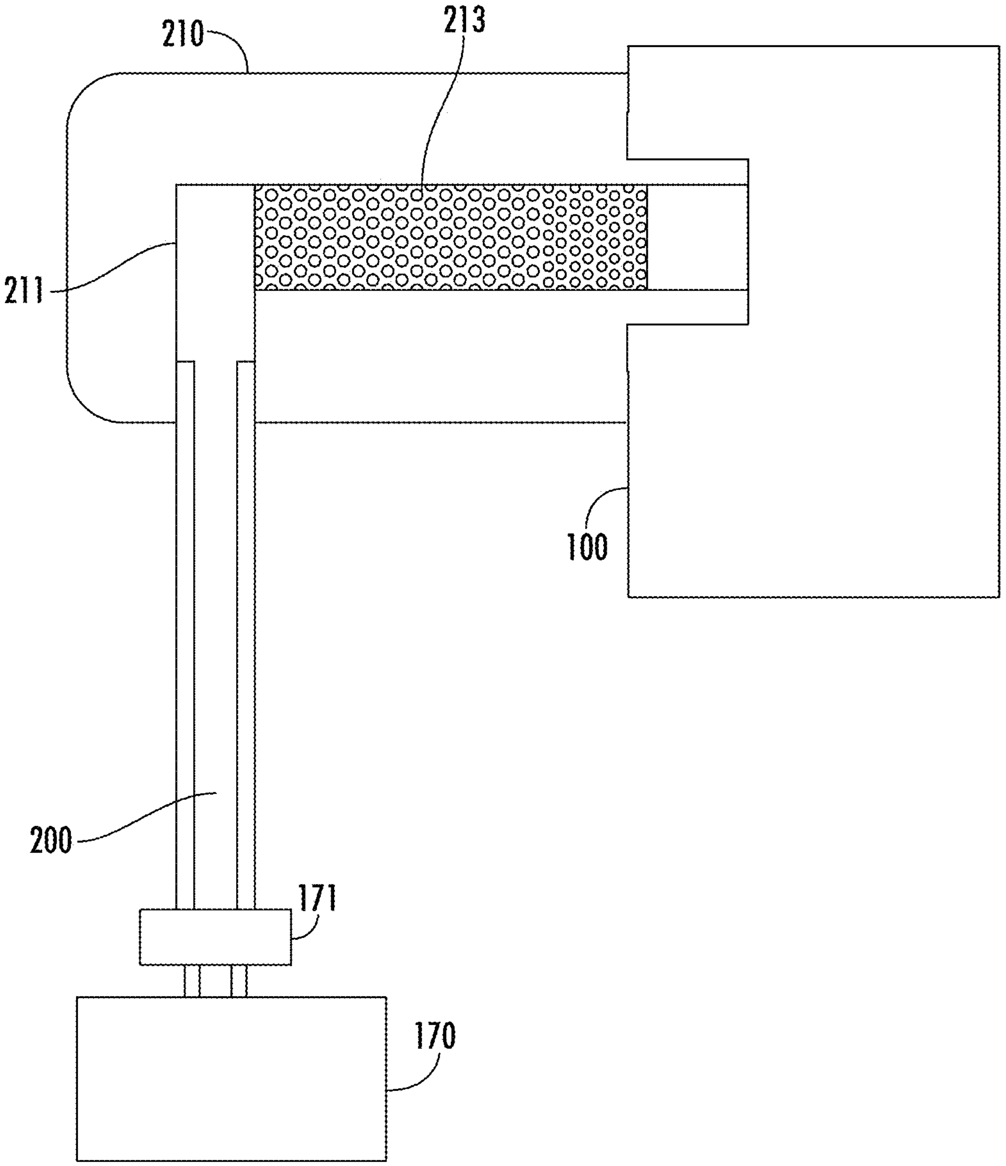
FIG. 9 shows a gas bushing that serves as the aluminum containing component according to a second embodiment.

Fins are only one possible mechanism to increase the surface area of the internal conduit 211. FIG. 9 shows another embodiment. In this embodiment, a lattice 213, which may be a gyroid, a honeycomb, or ball and beam structure, is incorporated into the internal conduit 211. The thickness of the walls of the lattice 213 may be 0.015 inches or more, with a similarly sized spacing between walls. The lattice 213 is integral with the gas bushing 210, and the gas bushing 210 may be created using an additive manufacturing process. The lattice 213 may have a constant porosity and density. In other embodiments, at least one of the porosity or density varies along the internal conduit 211. In operation, as etching gas flows through the gas bushing 210, it erodes the lattice 213 and delivers aluminum to the gas inlet 190 of the arc chamber 100. The lattice 213 may vary is shape, size, and density to encourage improved erosion.

In another variation of FIG. 9, the lattice is configured such that there is a spiral pathway through the lattice 213. This increases the surface area of the lattice, which encourages more erosion of the lattice 213.

While the above description discloses the use of aluminum as the dopant species, it is understood that the gas bushing shown in FIGS. 8 and 9 may be used with different dopant species. For example, the dopant species may be germanium, indium, gallium, or another similar material, and the gas bushing may be constructed of a solid that includes the dopant material. Further, other Group IV, halides or Group IV contained compounds may be used.

Further, while aluminum is described, other materials that have a melting point that is below the useable vapor pressure temperature used to provide ions to the ion source may also be used.

Further, while FIGS. 8-9 describe a sacrificial gas bushing, other embodiments are also possible. For example, in one embodiment, the exterior of the gas bushing 210 may be coated with a non-eroding material, such as graphite. In this way, the possibility of punch through, after the gas bushing 210 has been eroded, may be reduced.

In another embodiment, the gas bushing is made of a non-eroding material, such as graphite or tungsten. The internal conduit 211 may be coated with a material that contains the dopant species. The coating may be pure aluminum, or may be an aluminum containing material, such as an aluminum-based ceramic. In this embodiment, there may be fins that are non-eroding, that are also coated.

Figure 10:
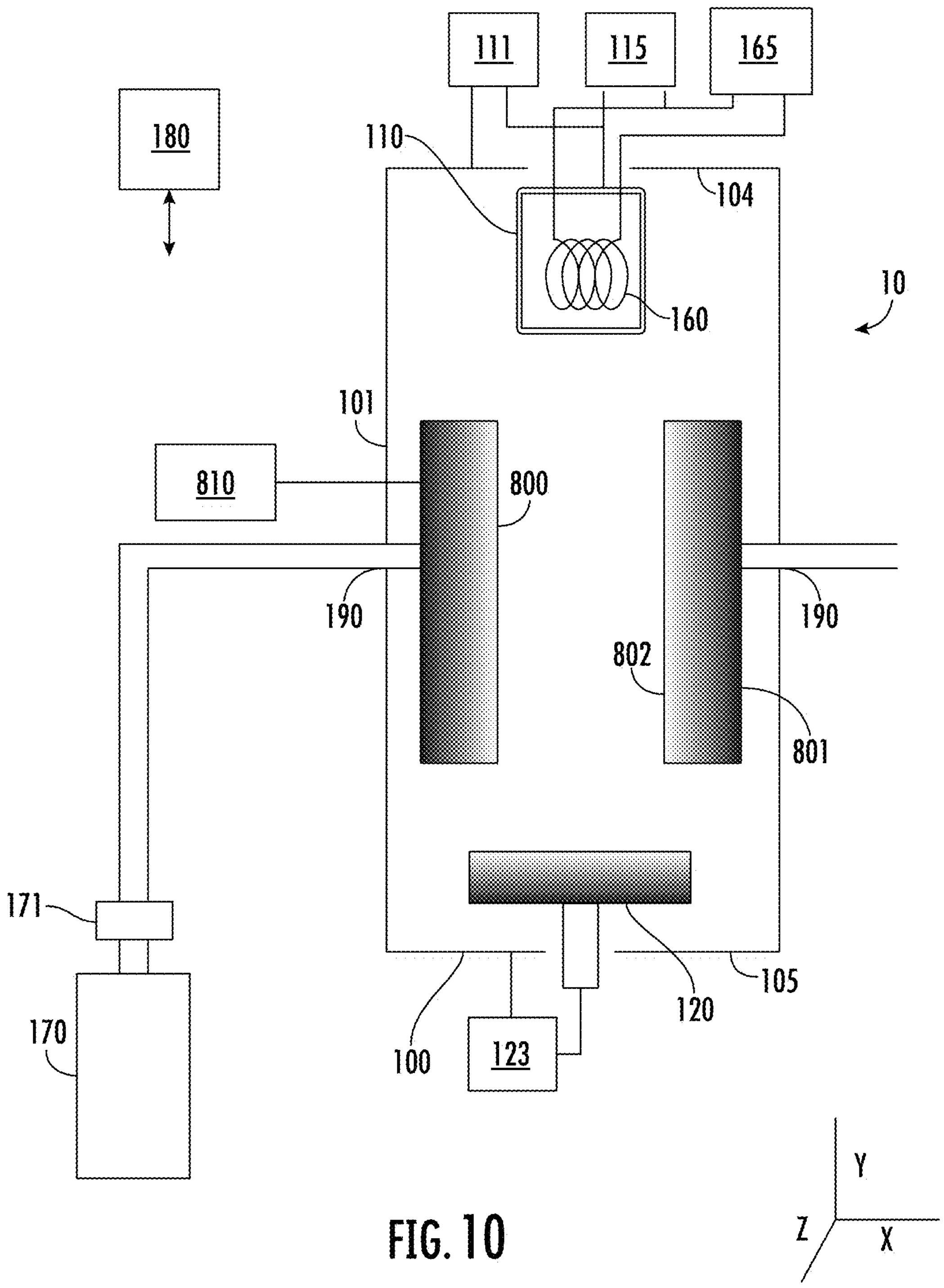
FIG. 10 shows an ion source with porous electrodes.

Other components may also be used as the source of the dopant material. FIG. 10 shows a top view of the arc chamber 100 according to another embodiment. In this configuration, there are side electrodes 800. In operation, one or both of the side electrodes 800 may be electrically biased. In this embodiment, the side electrodes 800 are also used to supply the dopant material to the arc chamber 100. Like the gas bushing described above, the side electrodes 800 may be constructed from a solid material that contains the dopant species, such as, but not limited to alumina or aluminum nitride. The side electrodes 800 may be formed so as to be porous, and may have a porosity and density gradient. For example, the side electrodes 800 may be more dense on the back surface 801 facing the wall 101 and less dense on the exposed surface 802 that interacts with the plasma. The gas inlet 190 is attached to the back surface 801 of the side electrode 800. The porosity of the side electrodes 800 may be such that there is a continuous path from the gas inlet 190 through the side electrode 800 to another surface, such as the exposed surface 802. In this way, the etching gas travels through channels in the side electrode 800, etching dopant material as it passes through the electrode that is then introduced into the arc chamber 100. As noted above, in certain embodiments, the side electrodes 800 may be electrically biased. In these embodiments, a conductive material, such as tungsten, may be disposed on portions of the exterior surfaces of the side electrode 800. This conductive material may be in communication with an electrode power supply 810.

This concept may also be applied to other electrodes that are disposed in the arc chamber, such as the repeller 120. The repeller 120 may be formed from a porous solid material that contains the dopant as described above. In this embodiment, a gas inlet 190 may be in communication with the back surface of the repeller 120. As described above, conductive material may be applied to portions of the exterior surfaces to allow the repeller 120 to be biased by the repeller bias power supply 123.

While this disclosure describes the introduction of a dopant species, such as aluminum, by passing an etching gas through an aluminum containing component, it is understood that there may be other gasses that are also used in the arc chamber. For example, a separate gas inlet may be used to introduce a second gas to the arc chamber. This second gas may also contain the dopant species, may be a diluent gas, or may be another gas.

The embodiments described above in the present application may have many advantages. As noted above, vaporizers are commonly used to provide aluminum to an arc chamber. However, vaporizers have long transition times, as it takes time to heat the vaporizer to the desired temperature and later cool the vaporizer. In each of these embodiments, the dopant gas, which includes aluminum, only enters the arc chamber if there is a flow of etching gas. Thus, by actuating valve 171, it is possible to enable and disable the flow of dopant gas much more quickly than is done using vaporizers. Additionally, vaporizers are sensitive to stray heat, which can affect the amount of vapor that is produced. In contrast, the flow rate of dopant gas is much more easily regulated using an etching gas. Other benefits of these embodiment compared to the prior art (vaporizer) include higher flexibility in design and operation, larger output, larger amount of dopant material which allows for longer source lifetime, and better stability and reliability which translates to higher mean time between failures. The materials used in these embodiments may also be more chemically stable when interacting with the atmosphere as compared to the highly reactive materials frequently used in vaporizers, which leads a significant improvement in storage, handling, and operational safety. Additionally, the materials used in these embodiments are usually more affordable than the alternatives.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An indirectly heated cathode ion source, comprising:
- an arc chamber, comprising a gas inlet;
- a source of an etching gas;
- an aluminum containing component;
- a valve, disposed between the source of the etching gas and the gas inlet, to control a flow of the etching gas; and
- a pathway from the source of the etching gas to the arc chamber through the gas inlet, wherein the pathway passes through the valve and the aluminum containing component before reaching the gas inlet, such that the etching gas flows through the aluminum containing component prior to entering the arc chamber, wherein a chemical reaction between the aluminum containing component and the etching gas causes aluminum to be introduced into the arc chamber.

2. The indirectly heated cathode ion source of claim 1, wherein the aluminum containing component comprises a cavity containing aluminum in liquid form, wherein the etching gas flows through the aluminum.

3. The indirectly heated cathode ion source of claim 1, wherein the aluminum containing component comprises a cavity containing aluminum in solid form, wherein the aluminum is configured as a porous structure and the etching gas flows through the porous structure.

4. The indirectly heated cathode ion source of claim 3, further comprising a heater disposed proximate to the cavity to increase a reaction rate of the aluminum and the etching gas.

5. The indirectly heated cathode ion source of claim 4, further comprising a cooler disposed proximate to the cavity, to control a temperature of the cavity.

6. The indirectly heated cathode ion source of claim 1, wherein the aluminum containing component comprises a cavity comprising a channel, wherein the cavity contains aluminum in solid form, and wherein the channel has open walls such that the etching gas reacts with aluminum as it flows through the channel.

7. The indirectly heated cathode ion source of claim 6, wherein the channel comprises a lattice.

8. The indirectly heated cathode ion source of claim 1, further comprising a gas bushing having an internal conduit, wherein the etching gas flows from the source of the etching gas, through the internal conduit and to the gas inlet, wherein the aluminum containing component is the gas bushing, which is made of alumina or aluminum nitride.

9. The indirectly heated cathode ion source of claim 8, wherein the gas bushing comprises fins extending into the internal conduit of the gas bushing.

10. The indirectly heated cathode ion source of claim 8, further comprising a lattice disposed in the internal conduit of the gas bushing.

11. The indirectly heated cathode ion source of claim 1, further comprising a gas bushing having an internal conduit, wherein the etching gas flows from the source of the etching gas, through the internal conduit and to the gas inlet, wherein the aluminum containing component is a coating disposed on walls of the internal conduit.

12. The indirectly heated cathode ion source of claim 1, further comprising an electrode disposed in the arc chamber in communication with the gas inlet, wherein the electrode comprises a porous material, wherein the etching gas flows from the source of the etching gas through the electrode, and wherein the aluminum containing component is the electrode.

13. The indirectly heated cathode ion source of claim 12, wherein the electrode is electrically biased, and portions of exterior surfaces of the electrode are coated with a conductive material.

14. The indirectly heated cathode ion source of claim 12, wherein the electrode comprises a side electrode or a repeller.

15. An indirectly heated cathode ion source, comprising:
- an arc chamber, comprising a gas inlet;
- a source of etching gas; and
- a gas bushing, having an internal conduit in communication with the source of etching gas and the gas inlet, wherein the gas bushing is constructed from a material comprising a dopant species.

16. The indirectly heated cathode ion source of claim 15, wherein the dopant species comprises aluminum and the material comprises alumina or aluminum nitride.

17. The indirectly heated cathode ion source of claim 15, wherein a feature is disposed in the internal conduit to increase a surface area of the internal conduit.

18. The indirectly heated cathode ion source of claim 17, wherein the feature comprises fins that extend into the internal conduit.

19. The indirectly heated cathode ion source of claim 17, wherein the feature comprises a lattice.

20. The indirectly heated cathode ion source of claim 19, wherein the lattice comprises a spiral path.

* * * * *